United States Patent [19]
DeFazio et al.

[11] Patent Number: 5,940,484
[45] Date of Patent: Aug. 17, 1999

[54] SELF-PROVISIONING NAMES DATABASE FOR CALLER IDENTIFICATION SERVICES

[75] Inventors: Pamela Lilly DeFazio, Ocean; Joseph J. Serinese, Bridgewater, both of N.J.

[73] Assignee: AT & T Corp., Middletown, N.J.

[21] Appl. No.: 08/846,076

[22] Filed: Apr. 25, 1997

[51] Int. Cl.⁶ .............................. H04M 1/56; H04M 15/06
[52] U.S. Cl. ...................... 379/142; 379/93.23; 379/127; 379/229
[58] Field of Search ...................................... 379/112, 115, 379/121, 122, 125, 127, 130, 134, 136, 137, 139, 140, 142, 45, 93.14, 93.17, 93.23, 93.25, 111, 120, 128, 133, 242, 247, 93.01, 143, 354, 355, 207, 201; 455/415, 433, 575, 566–567

[56] References Cited

U.S. PATENT DOCUMENTS

| | | | |
|---|---|---|---|
| 5,481,603 | 1/1996 | Gutierrez et al. | 379/221 |
| 5,526,406 | 6/1996 | Luneau | 379/142 |
| 5,568,546 | 10/1996 | Marutiak | 379/355 |
| 5,592,546 | 1/1997 | Takahashi | 379/355 |
| 5,734,706 | 3/1998 | Windsor et al. | 379/142 |
| 5,748,724 | 5/1998 | Sonnenberg | 379/212 |
| 5,754,636 | 5/1998 | Bayless et al. | 379/142 |
| 5,761,278 | 6/1998 | Pickett et al. | 379/45 |
| 5,764,747 | 6/1998 | Yue et al. | 379/88.22 |

*Primary Examiner*—Curtis A. Kuntz
*Assistant Examiner*—Binh K. Tieu

[57] ABSTRACT

A self-provisioning names database adds new names to a database for associating names to calling address data in a caller identification with name delivery service. A new caller's name is added to the database each time the new caller places a call to a service subscriber. The database reaches only a nominal size in accordance with Perado's rule that approximately 80% of incoming calls to a subscriber will be from the same small group of callers. Alternatively or in addition, a new party's name is added to the database each time a service subscriber places a call to a party whose name is not already in the names database. Caller names that have been stored in the database and not retrieved for a long period of time are discarded to store new names. Also, the database may periodically request updated data for a stored name, for example, to determine if a different telephone number or address has been assigned to the given name data.

33 Claims, 5 Drawing Sheets

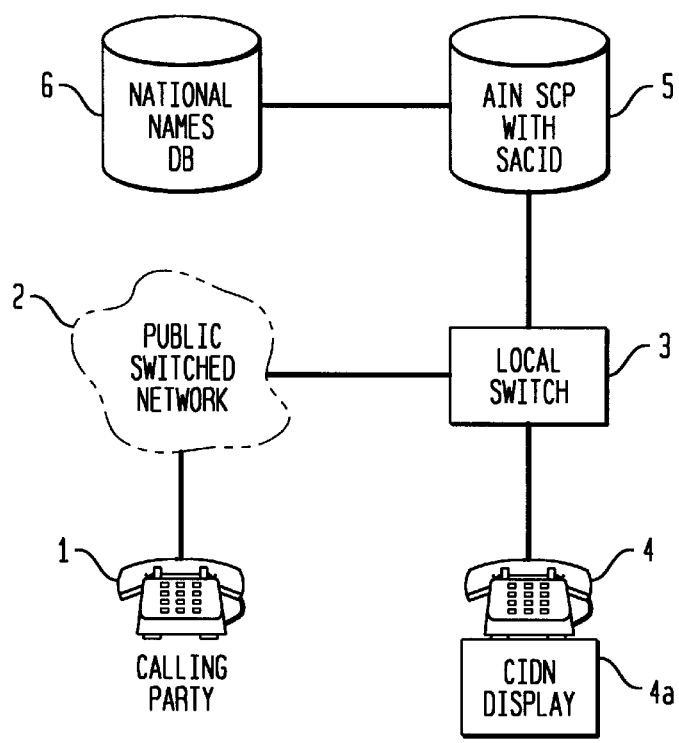

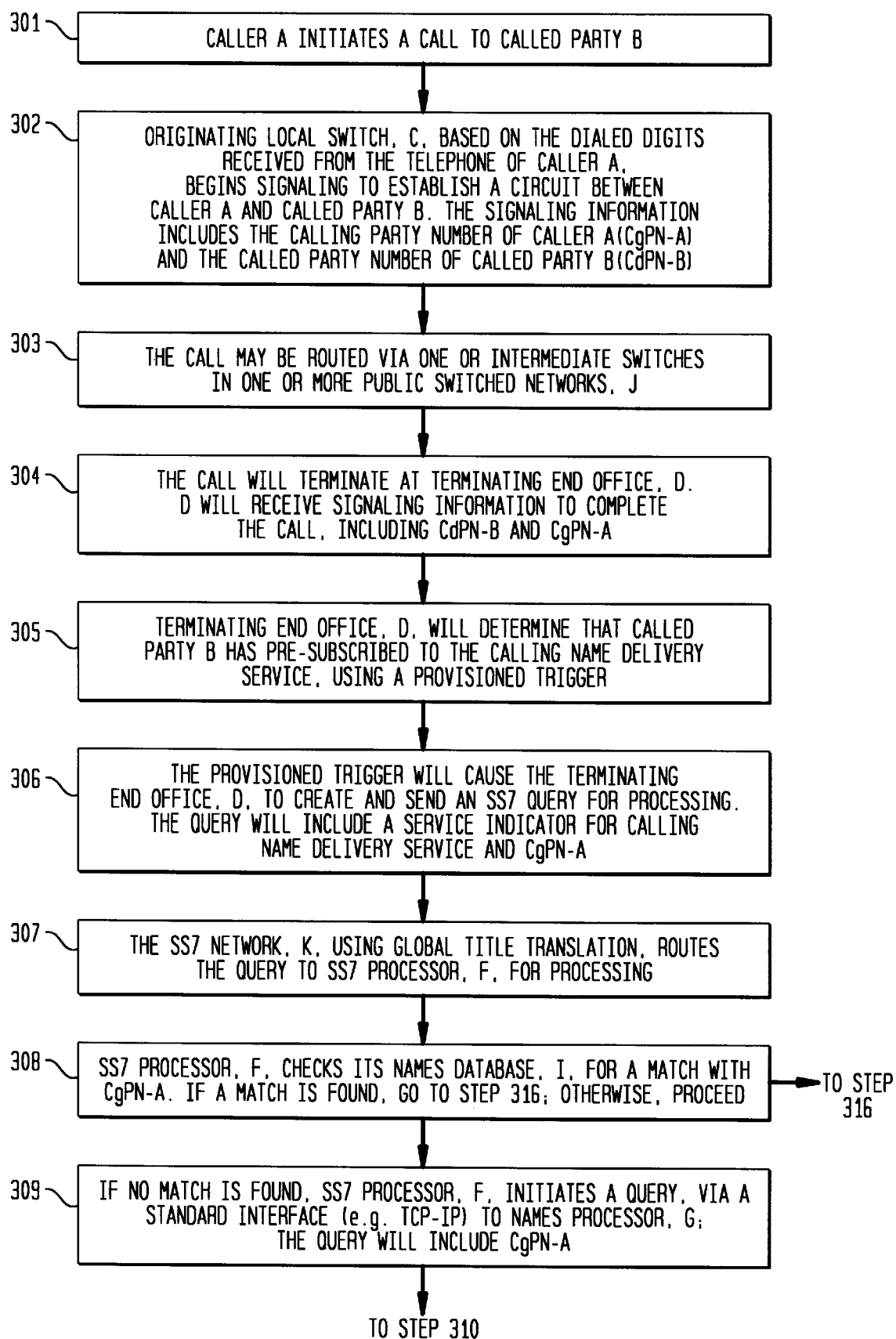

SELF-PROVISIONING NAMES DATABASE FOR CALLER IDENTIFICATION SERVICES

BACKGROUND OF THE INVENTION

1. Technical Field

This invention relates to telecommunications services for providing caller identification information to a called party and, more particularly, to a self-provisioning names database for such services.

2. Description of the Relevant Art

Over the years caller services have increased due to the computerization of telecommunications services. For example, one such service that is now provided to telecommunications subscribers is caller identification. As a caller places a telecommunications call to a called party and enters address signaling data for signaling the called party, both the calling party's telephone number and the called party's telephone number are transmitted to the telecommunications switch, typically a Lucent Technologies #5ESS electronic switch, serving the called party. As the called party's line rings, the switch serving the called party also provides data to the subscriber loop or trunk to the subscriber's premises which can actuate a display to display the calling party's telephone number at the called party's premises.

Since the introduction of the caller identification service by telephone number, local operating telephone companies have also offered a related service for providing the name of the calling party. Subscribers to such a service are provided a display of both the telephone number and name of the calling party for an extra fee. The local operating telephone company will generate a query during a call of a remote billing database, for example, a database maintained by the operating telephone company serving the calling party, to perform a number to name translation and forward the name data to the calling party along with the telephone number for display. Others besides the operating telephone companies may maintain a similar database that may attempt to maintain a names list, for example, for all the telephones in an entire country or region thereof. Of course, any such entity may charge for access to such a regional or national database that it maintains.

A problem persists, however, in that in providing such name identification services, the local operating telephone companies must rely on other telephone companies or national database access providers to provide the name information. Also, the information may not be provided in time to be signaled via a subscriber's display before the subscriber must answer the phone. Finally, the costs of providing such a service may become high in relation to the perceived value to the customer. Consequently, there remains a need in the art to provide a caller identification by number and name service that is economical and efficient.

SUMMARY OF THE INVENTION

A self-administering caller identification and names database provides an efficient and cost-effective database that translates the calling party's telephone number to the name of the person listed as the subscriber to that telephone number. The database may utilize advanced intelligent network (AIN) or other related or similar services for obtaining at least the telephone number of the calling party. The database relies on a principle that has evolved over time known as Perado's rule in the art of telecommunications traffic administration. That principle relates to the statistic that some 80% of incoming calls to a residence or even a business location will be from the same, small group of callers. In some instances, the percentage can reach 90%. A local operating telephone company services only a portion of a total national population. Thus, the local company need not maintain a particularly large names database for its subscribers.

A local operating telephone company or a private entity may apply Perado's rule to provision of a number plus names database either for their subscribers. For example, the entity may provide such a database as close to the served subscriber as possible, for example, in association with the serving telecommunications switch, typically a #5ESS switching system manufactured by Lucent Technologies, Inc. or with a private branch exchange or station apparatus. For example, if ten thousand subscribers are served by the switch and a calculable portion of them subscribe to caller number plus names service, then, the database can be sufficiently small to be easily maintained and locally administered and provisioned.

The self-administering caller identification and names database creates itself by storing and maintaining the results of queries to other databases. When a call is placed to a subscriber to the names database service, the database will first query itself, but, if no name can be retrieved, the database generates a query of a remote database. If the search is successful and there is a response to the query, it is stored in the names database along with a time and date stamp and a count of the number of times since first entered. Other callers may receive calls from the same caller, but the name of that caller is typically stored only once in the names database. Thus, the database may be shared by all subscribers to the names database service and database memory is conserved. If the search provides a name quickly enough, the name with or without the calling telephone number can be timely transmitted to the names identification service subscriber and displayed.

A corollary to Perado's rule may be stated as follows: 80% or more of outgoing calls from a calling party will be placed to the same small group of called parties. Moreover, it likely follows that this same small group of called parties will be placing calls to that same calling party. Consequently, the names database may be built by querying for a name on the event of either an incoming call or an outgoing call or either form of call and adding the name to the database.

As calls are placed by or to those subscribers who subscribe to the names database service, the names database should begin to fill. Once full, the database must provision or maintain itself by deleting the oldest information. For example, the name record with either the fewest number of hits or the longest time since last accessed or a combination of such events are likely candidates for deletion. Telephone service subscribers move locations, and their telephone numbers are reassigned. Consequently, the database periodically audits data and purges names and associated data entries that have not placed calls to subscribers who subscribe to the names database service within a predetermined period of time. On the other hand, the names database should be provisioned to grow in proportion to the popularity of the names service and the number of network subscribers served at the serving central office, of extensions of the private branch exchange or station apparatus associated with the names database.

Besides being located at a serving central office or another location close in the network to the subscriber, the database of the present invention may be maintained at a private branch exchange and shared among parties at extensions of the private branch exchange. Also, with ISDN service growth, station apparatus serving individual residences or groups of subscribers may have associated self-administering databases as described herein.

Further details and features of the self-provisioning database for storing names of callers for display at called party premises may be understood from a careful reading of the detailed description thereof which follows.

BRIEF DESCRIPTION OF THE DRAWINGS

FIG. 1 is a typical system diagram showing the self-provisioning names database associated with a local telecommunications switch.

FIG. 2 shows a typical field for a names record of the self-provisioning database.

DETAILED DESCRIPTION

Figure 3B:
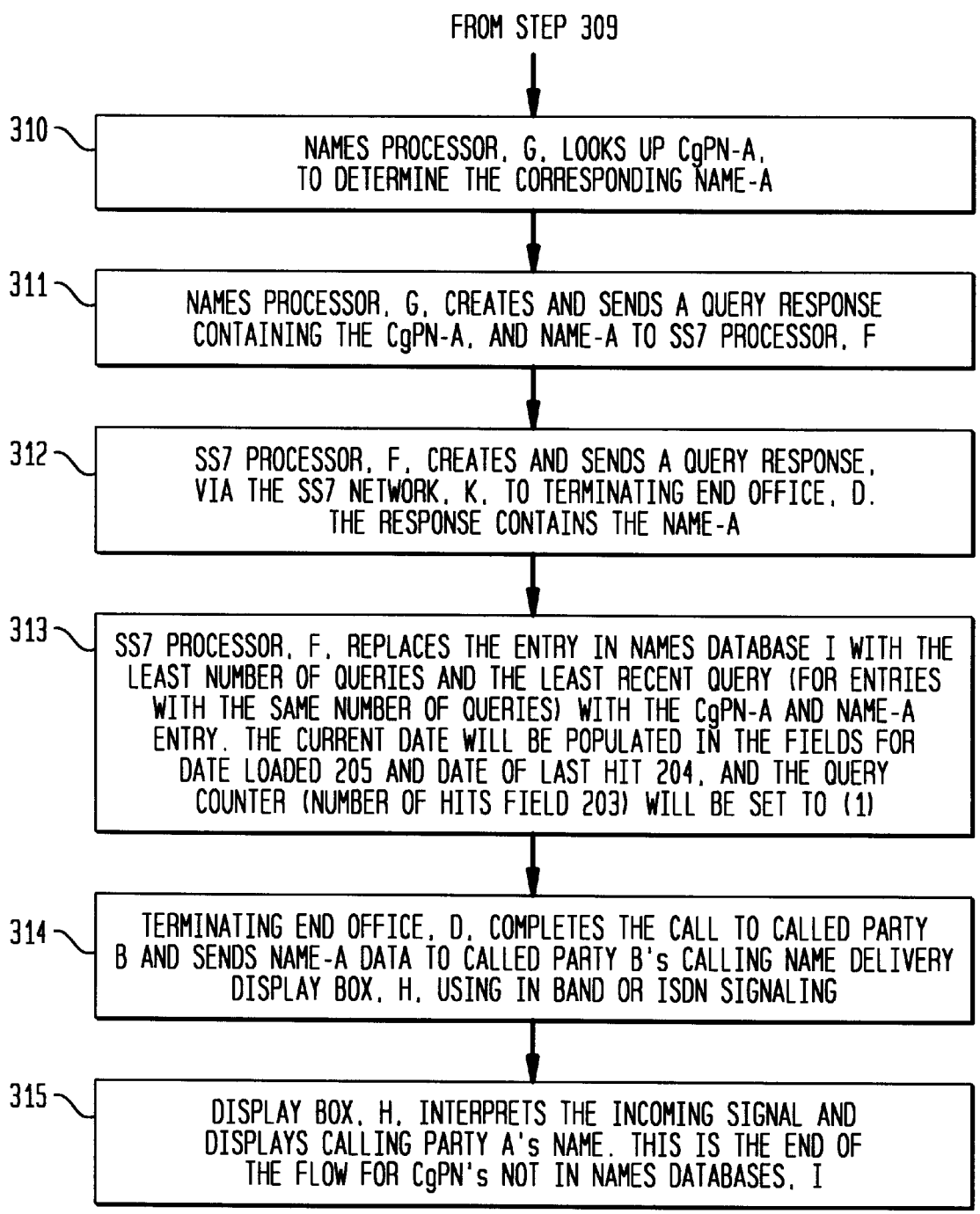
FIG. 3 is a flowchart showing typical caller flow.

Referring to FIG. 1, there is shown a typical system diagram for describing the database of the present invention. A calling party 1 places a call through the public switched telephone network 2 and is ultimately connected to a local switch 3 serving a called subscriber 4 having a telephone and an associated caller identification display unit 4a. A number to name translation database 5 may comprise a database of a personal computer equipped with private line or switched modem access to local switch 3. Database 5 may be preferably located as close to the called subscriber 4 as possible and may be located, for example, at a central office serving the subscriber 4, at a private branch exchange (not shown) or on the customer's premises. Also associated with the names database 5 there is shown a separate link to a typical national or other names database 6. Names database 6 typically on request of switch 3 performs a translation from a telephone address such as a telephone number or Internet address to a name and forwards fro display on display 4a. Now, in order to build a local names database 5 according to the present invention, the names translation result is reported to the database 5 on request.

There may be more than one such names database 5 under processor control, for example, one for each local telephone operating company, Internet service provider, private branch exchange owner, station apparatus owner or other alternative database. Each performs the similar function of converting an address to a name and reporting the result.

Referring to FIG. 1, the operation of the names database 5 will be briefly explained. When a caller first calls a database subscriber 4 (one who subscribes to the names database service), the local switch (or private branch exchange switch) is unable to forward an associated name to the subscriber display apparatus 4a. It can forward other information known of the calling party such as a calling party's address or telephone number.

The local switch (or private branch exchange switch) requests the names database 5 to provide such a name. Database 5 queries itself, but, finding no name in its database associated with the calling party's address, database 5 initiates a further query to national database 6. If no response is forthcoming from database 6, the database 5 may request the information of an alternative database like a database (not shown), for example, of a local operating telephone company or a private names database.

If a name reply is retrieved, an entry is recorded in the self-provisioning names database 5 in conformity with FIG. 2. FIG. 2 suggests that the data record for database 5 comprise a telephone number (or Internet address) 201, a name associated with the number or address 202, a count or number of hits 203, a date and time of the last hit 204 and a date and time of the first hit or when originally the name record was loaded 205 into the names database 5. A group of subscribers share names database 5 so that a name of a caller, even if the caller calls more than one subscriber, is typically only stored in the database once.

Now, in an embodiment not shown, there may be plural names associated with a single number or a nickname such as "mom" or "dad" that may be added/modified by a subscriber through a secure dial-in connection via the Internet or a telecommunications link to the names database 5. For example, if (540) 349-1757 represents the telephone number for "mom" and "dad", an associated station apparatus display 4a may indicate "mom and dad" in stead of their directory listing names either together with their phone number or in place of their telephone number if a call is either directed to or from them. On the other hand, if called party A and called party B, who both subscribe to the names database service of the present invention, receive a call from the same calling party C, the name of calling party C may only appear once in the database 5 in order to save data storage capability in the database 5. Consequently, providing nicknames or plural names in the database for the same calling party C requires additional memory. The record of FIG. 2 would have to be modified to permit personalization information. This information would include the subscriber's telephone number and their personal name for Name field 202. An additional fee may be charged for the plural name storage or nickname storage service. The field or display size of display 4a may be varied accordingly to accommodate alternate names, plural names or nick names as appropriate.

For the first call to a subscriber or by that subscriber, the database 5 may already have the name of the other party than the subscriber in their database because another subscriber may have already placed a call or received a call from that party. If not, a query must be made of database 6. If a reply is received from database 6 before the subscriber 4 answers the call, the display 4a can be updated with the name of the calling party stored in the database 6 for the number of the caller. Also, the name received from database 6 is added to database 5 according to the suggested format for Name 202 of FIG. 2 along with their Phone number 201 and date loaded 205. More importantly, the next time that named caller calls subscriber 4 or any other subscriber to the names database 5, no query need be formulated of any database 6 from database 5. The self-provisioning database 5 simply updates the count of the number of hits 203 (FIG. 2) from one to two and the date of the last hit 204 to the current date, and time and the expense of a query of database 6 is saved.

In accordance with the above discussion, the storage of a name or the updating of a name file according to FIG. 2 is initiated on a call that terminates with a subscriber 4 of the present names database 5. In an alternative embodiment, the initiation of the storage of a name or a file update can be triggered by an outgoing call by a subscriber to the present database 5. That is, when a subscriber 4 initiates a call, the name query will be made of database 6 unless the telephone number 201 is already in the database 5. According to an extension of Perado's Rule, the called name will likely be a frequent caller to the subscriber 4. Database 5 will store or update a record according to FIG. 2 and be able to identify the name of the party the next time the called party calls the subscriber. In a further embodiment, the called party's name can be added to the database or the number of hits incremented and the date of last hit updated in either the event of a call by subscriber 4 to the named called party or when the called party calls the subscriber 4. On an outgoing call, displaying the name of a called party at subscriber display 4a provides feedback that the subscriber dialed the correct telephone number by providing the called party's name (which can supplement a display dialed number arrangement).

Referring to FIG. 3, the call process will be described in greater detail with reference to FIGS. 1 and 2 and FIG. 5. In the described embodiment, the addition of a name to the database is triggered by the placement of an incoming call to a subscriber to the database 5 of FIG. 1. An embodiment in which the addition of a name to database 5 is triggered by an outgoing call or either an incoming call or outgoing call is not shown but may be easily implemented by one of ordinary skill in the art and without having to resort to undue experimentation.

Figure 3C:
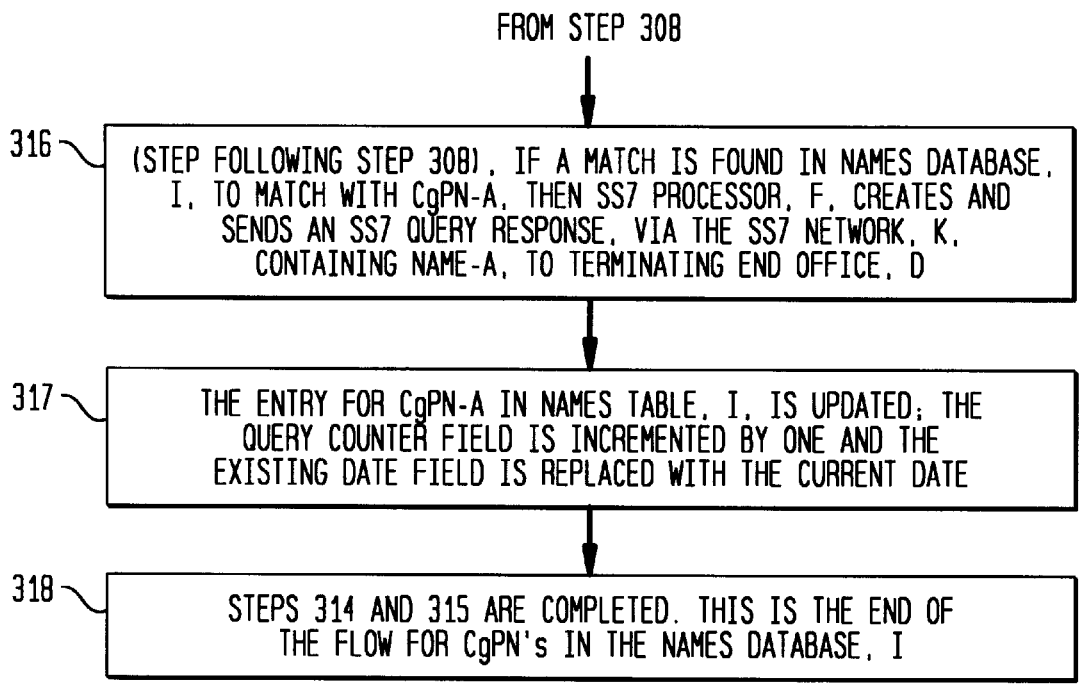
Figure 5:
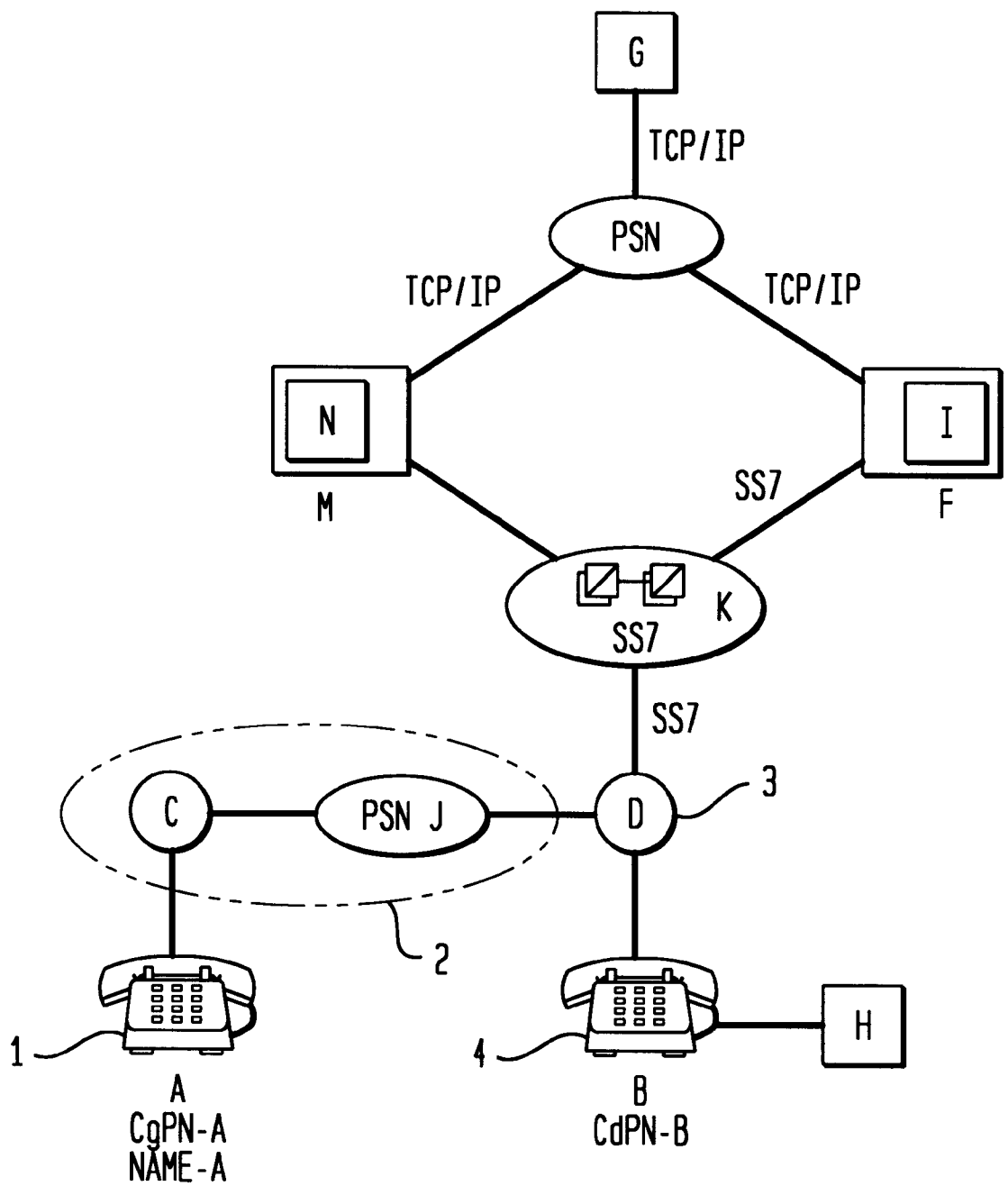
FIG. 5, similar to FIG. 1, provides a more detailed system block diagram for describing one system implementation of the database for use in explaining the flowcharts of FIG. 3 and 4.

FIGS. 3 and 5, similar to FIG. 1, describes a particular implementation of the calling party/names self-provisioning database 5 but implemented in a Signaling System 7 (SS7) environment. Similar reference numerals are used in FIG. 5 to denote similarly depicted elements in FIG. 1. FIG. 3A describes steps 301–309 of the process; FIG. 3B describes steps 310–315 of the process; and FIG. 3C describes steps 316–318 of the process. Arrows are used generally to indicate process flow; however, the process flow should not be deemed to be limited to the depicted process as steps may occur either before or after other steps in the flow. For example, steps 312 and 313 may be reversed in order and time among others.

Referring to FIG. 3, at step 301, a caller A initiates a call to called party B. Schematically, caller A may be calling party 1 and called party B, subscriber apparatus 4, according to FIG. 1.

At step 302 and referring to FIG. 5, originating local switch C (a part of the public switched network cloud 2 of FIG. 1), based on the dialed digits received from caller A, begins signaling to establish a voice/data link between caller A and called party B connected to a terminating central office D, designated local switch 3. The signaling information, including calling party number of caller A (CgPN-A) and the called party number of called party B (CdPN-B), is forwarded to local switch 3 via a signaling link.

At step 303, the call may be routed via one or more intermediate switches in one or more public switched telephone networks J (cloud 2) to local switch 3. These switches may comprise tandem switches and/or toll centers where voice/data links known as trunks are provided via satellite, optic fiber, coaxial cable, land-based microwave and other facilities known in the art (not shown).

At step 304, at least a signaling link will be terminated at local switch 3 and, via the signaling link, at least the terminating central office D (switch 3) will receive the calling party telephone number or address CgPN-A and the called party number or address CdPN-B.

At step 305, the terminating office D (switch 3) will first determine what services, if any, the called party B has subscribed to, for example, the caller identification including name service of the present invention and referred to in the drawing as Calling Name Delivery Service. This may be accomplished by local switch 3 referring to a local service database (not shown) which associates a called party with the services they have subscribed to.

At step 306, to determine the services subscribed to by called party B, a database controller may perform a service look-up query from local switch 3. If the called party B is a subscriber to the caller name service, then, the local switch 3 initiates the creation and transmittal of an SS7 or related query for processing. The query may include a service indicator for the present service (for example, shorthand data representing Caller Name Delivery if the service is so named) and the calling party's telephone number CgPN-A.

At step 307, the SS7 network K, using, for example, Global Title Translation or related translation service, routes the query to a first SS7 processor F for processing. Processor F may be associated with database 5 shown in FIG. 1. Processor F may have a local names database, I. Alternatively, the SS7 network K, using, for example, Global Title Translation, might route the query to another, perhaps regional SS7 processor, m, having a names database, N.

At step 308, processor F checks its Name Database I (name database 5) for a match with CgPN-A. If a match is found, then, call progress steps to step 316 below. If not, call progress proceeds with step 309.

At step 309, when no match is found, the SS7 processor F initiates a query via, for example, a standard interface (e.g. telecommunications protocol/Internet Protocol (TCP/IP) interface) to Names Processor G associated with a database 6, which may be a national or other regional database or private database. The query should include the CgPN-A information, including area and even country code as required internationally to uniquely identify a calling subscriber, Name-A.

Names processor, G, at step 310 looks up CgPN-A to determine the corresponding Name-A.

At step 311, names processor G creates and transmits a query response containing CgPN-A and Name-A to SS7 Processor F (if it can).

At step 312, the SS7 processor F, responsive to receipt of the names processor response, creates and transmits a related query response via the SS7 network K to terminating end office D (local switch 3). The response includes Name-A.

At step 313, the SS7 processor F replaces the entry in Names Database I (database 6) with the least number of queries and the least recent query (for entries with the same number of queries) with the CgPN-A, Name-A entry and other data per FIG. 2. In particular, the current data will be populated in the fields for date loaded and date of last hit, and the query counter (number of hits field) will be incremented by one (and for the first hit be recorded as 1).

In furtherance of step 313, the conditions for replacement of old data may vary from requiring both least number of queries and least recent query to one or the other or other criteria that may developed therefrom such as number of hits over most recent unit of time (for example, number of hits in the last three month period).

In step 314, terminating end office D completes the call to called party B and sends Name A data to Called Party B's display using, for example, in-band, ISDN or other signaling means.

At step 315, the display box of apparatus 4 interprets the incoming signaling data and displays calling party A's name. Step 315, thus, is the end of caller name processing if the name is not already stored in database 5.

At step 316, following step 308, if a match is found in database 5, Names Database, I, to match with CgPN-A then, SS7 Processor F creates and transmits an SS7 query response via SS7 network K containing Name-A to terminating central office switch D (switch 3).

At step 317, the entry for CgPN-A in the Names Table is updated per FIG. 2, the count of hits 203 incremented by one, the date of this hit recorded as the last hit 204 and so on.

Step 318 relates to the display of the data at the subscriber apparatus 4 and so relates to the performance of steps 314 and 315. This is the end of call flow for CgPN in the Names Database I (database 5).

A slight variation relates to a situation when a first database 6 fails to provide a Name for a calling party. As described above, a TCP/IP query may result in a query of more than one database, but even these may come up empty. Then, a back-up list of databases may be contacted for Name-A by other than a TCP-IP query, for example, by way of a dial up connection to a private database. The name that is eventually retrieved may not be timely retrieved so it can be displayed in this call, but it may be locally stored in database 6 for the next call from that calling party A.

Note that as calls are completed to the local switch 3 and its group of subscribers to names services, the database will efficiently collect, store and maintain names that are likely candidates for repeats or hits according to Perado's Rule. Consequently, the names database should reach a size that becomes only dynamic in the sense that the desire for the service may grow. The subscriber likely will continue to receive calls from the same calling parties. So once the database is grown and learned, it assumes a relatively stable size. Old names are automatically deleted and, often times, will be deleted, not so much because they have not called recently, but because, in fact, they have moved or changed telephone numbers.

Figure 4:
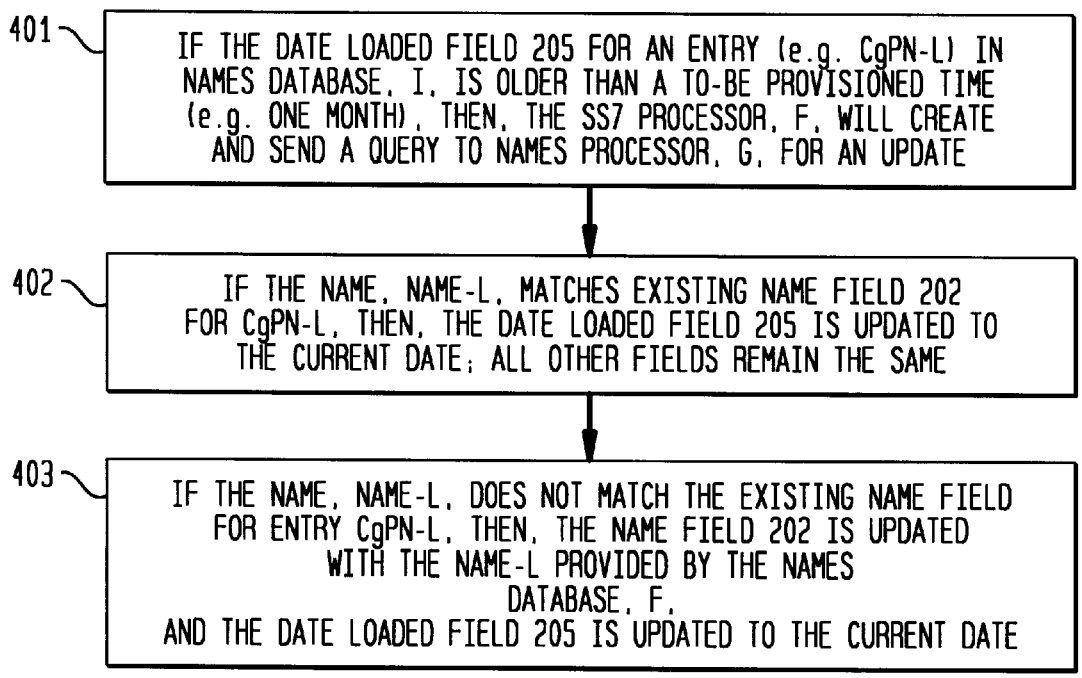
FIG. 4 is a typical flowchart describing the self-provisioning feature of the database.

Referring now to FIG. 4, the non real-time self-provisioning feature of the database 5 will be further described. In addition to the real-time provisioning feature where the database 5 learns as described above the names of calling parties that are likely callers of called party 4, a non-real-time background provisioning activity is needed and described by FIG. 4. This activity accounts for numbers that have been reassigned to new users.

According to step 401 and again referring to FIG. 5, if the date loaded field for an entry (for example, CgPN-L) to Names Database I (database 5) is older than a to-be-provisioned time (for example, one month), then the SS7 processor F will create and transmit a query to Names Processor G (database 6) for an update.

At step 402, if the name, Name-L, matches an existing name field Name for CgPN-L, then the Date Loaded field 205 is updated to the current date and all other fields remain the same.

At step 403, if the name Name-L does not match the existing name field Name 202 for entry CgPN-L, then the Names field 202 is updated with the Name-L provided by the Names Database F and the Date Loaded field 205 is updated with the current date.

In this manner, off-line, the value of the names data stored locally in database 5 can be periodically reevaluated.

The present invention is provided by way of description of one embodiment. The principles of the invention may be extended to providing names entries for telecommunications related services such as Internet services, television/video conferencing services and the like. The names database and service may be implemented at an end office switch or in association with a private branch exchange on or off a customer's premises. ISDN or SS7 signaling may be used for the names query. In yet another embodiment, telephone station apparatus may been designed to permit local storage of a names database for a residential user or group of subscribers for translating the forwarded calling party's telephone number into the caller's name or a shorthand therefor. The scope of the invention should only be deemed limited by the claims which follow.

What we claim is:

1. A method of administering a database for use in providing a call party name delivery service comprising the steps of:

receiving at the database party address data at the initiation of a first call;

querying another database for a party name responsive to the received party address data storing the party name with the party address in the database;

out putting the party name for display prior to answer of the first call;

receiving the same party address data at the initiation of a second call; and retrieving and outputting the stored party name from the database responsive to the same party address data prior to answer of the second call.

2. A method of administering a database as recited in claim 1 wherein said name querying step comprises an SS7 network query.

3. A method of administering a database as recited in claim 1 wherein said name querying step comprises a local query.

4. A method of administering a database as recited in claim 1 wherein said storing step comprises the step of storing calling party names for a predetermined subset of subscribers.

5. A method of administering a database as recited in claim 1 wherein said party name storage step further comprises storing data representing the date the party name was loaded in the database with the party name and address.

6. A method of administering a database as recited in claim 1 wherein said party name storage step further comprises storing data representing the date of last receipt of party address data for the party name with the party name and address stored in the database.

7. A method of administering a database as recited in claim 1 wherein said party name storage step further comprises incrementing a counter of matches between party name data and stored name data and storing the count of matches with the party name and address stored in the database.

8. A method of administering a database as recited in claim 1 further comprising the step of matching party name data with name data stored in the database.

9. A method of administering a database as recited in claim 8 further comprising the step of incrementing a counter of the number of matches for each match of party name data with stored name data.

10. A method of administering a database as recited in claim 9 further comprising the step of deleting a name record with the least number of matches when a new name record is stored.

11. A method of administering a database as recited in claim 6 further comprising the step of deleting a name record with the oldest date of last receipt when a new name record is stored.

12. A method of administering a database as recited in claim 1 further comprising the step of deleting the oldest name entry when the a new name record is stored and the database reaches a predetermined capacity.

13. A method of administering a database as recited in claim 4 further comprising the step of initiating a query for a new address when the name loaded date is older than a predetermined period.

14. A method of administering a database as recited in claim 13 further comprising the step of loading a new address for a name and updating the date loaded date to the current date if a new number is assigned to the queried name.

15. A method of administering a database as recited in claim 13 further comprising the step of updating the date loaded date to the current date if the name and address data has not changed in response to the query.

16. A method of administering a database as recited in claim 1 wherein said address data receiving step is responsive to an incoming call to a subscriber to the call party name delivery service.

17. A method of administering a database as recited in claim 1 wherein said address data receiving step is responsive to an outgoing call from a subscriber to the call party name delivery service, the party name data being output for display to the subscriber prior to outgoing call answer.

18. A method of administering a database as recited in claim 1 further comprising the steps of:
receiving alternate name data from a subscriber to the call party name delivery service;
storing said alternate name data associated with address data of said subscriber, and
outputting said alternate name data for display prior to call answer.

19. A method of administering a database as recited in claim 1 comprising the initial step of associating said database with a central office switch serving a subscriber of said calling party name delivery service.

20. A method of administering a database as recited in claim 1 comprising the initial step of locating said database on the premises of the user of said service.

21. A method of administering a database as recited in claim 1 comprising the initial step of associating said database with a private branch exchange.

22. A method of administering a database as recited in claim 1 comprising the initial step of associating said database with station apparatus.

23. A method of administering a database as recited in claim 1 further comprising the step of generating calling party name output data for transmission to an output device of a subscriber to the call party name delivery service.

24. A method of administering a database as recited in claim 1 wherein said name querying step comprises the steps of querying a first database for said name and, in the event said query is unsuccessful, querying a second database for said name.

25. A method of administering a database as recited in claim 24 wherein said first database is local and said second database is remote and further comprising the step of
providing a subscriber to the service with data representing the party name identified from the name querying step.

26. A method of providing a service to a user with the use of a first database and a second database, said method comprising the steps of:
receiving party address data at the initiation of a user communication;
querying said first database for a party name responsive to received party address data;
providing said user with data representing a party name from said first database at the initiation of the user communication when the first database querying step is successful,
when the first database querying step is unsuccessful, querying said second database for a party name responsive to received party address data,
providing said user with data representing a party name from said second database at the initiation of the communication when the second database querying step is successful, and
storing name data obtained from the second database querying step in the first database, the name data being associated in the first database with the received party address data.

27. A method of providing a service as recited in claim 26 further comprising the step of
deleting a name record with the least number of matches when said name data from querying said second database is stored in said first database.

28. A method of providing a service as recited in claim 26 further comprising the step of
deleting the oldest name entry in said first database when said name data from querying said second database is stored in said first database.

29. A method of providing a service as recited in claim 26 wherein said name data storage step is performed when said first database has not reached a predetermined capacity.

30. A method of providing a service as recited in claim 29 wherein said name data storage step is performed when said name data is associated with address data within a geographic region served by said first database.

31. A method of providing a service as recited in claim 26 wherein the success of a query is determined by the age of the name data retrieved from the query.

32. A method of providing a service as recited in claim 26 wherein the success of a query is determined from the result of a match between received party address data and stored party address data in one of said databases.

33. A method of providing a service as recited in claim 26 wherein said second database name querying step comprises an SS7 network query.

* * * * *